(12) United States Patent
Goermer et al.

(10) Patent No.: US 9,467,301 B2
(45) Date of Patent: Oct. 11, 2016

(54) NETWORK INTERFACE UTILIZATION DEPENDENT CHARGING DETERMINATION

(75) Inventors: Gerald Goermer, Wandlitz (DE); Petr Sanda, Slapanice (CZ)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 13 days.

(21) Appl. No.: 14/385,612

(22) PCT Filed: Mar. 19, 2012

(86) PCT No.: PCT/EP2012/054780
§ 371 (c)(1),
(2), (4) Date: Sep. 16, 2014

(87) PCT Pub. No.: WO2013/139365
PCT Pub. Date: Sep. 26, 2013

(65) Prior Publication Data
US 2015/0049647 A1 Feb. 19, 2015

(51) Int. Cl.
*H04L 12/16* (2006.01)
*H04L 12/14* (2006.01)
*H04M 15/00* (2006.01)
*H04W 8/02* (2009.01)

(52) U.S. Cl.
CPC ....... *H04L 12/1403* (2013.01); *H04L 12/1425* (2013.01); *H04L 12/1446* (2013.01); *H04M 15/43* (2013.01); *H04M 15/50* (2013.01); *H04M 15/65* (2013.01); *H04W 8/02* (2013.01); *H04M 15/52* (2013.01)

(58) Field of Classification Search
CPC ........... H04L 12/1403; H04L 12/1425; H04L 12/1446; H04M 15/43; H04M 15/50; H04M 15/52; H04M 15/65; H04W 8/02
See application file for complete search history.

(56) References Cited

U.S. PATENT DOCUMENTS

| | | | | |
|---|---|---|---|---|
| 2002/0127995 A1* | 9/2002 | Faccinn | ............... | H04L 12/14 455/406 |
| 2002/0191597 A1* | 12/2002 | Lundstrom | ....... | H04L 29/06027 370/356 |
| 2006/0114932 A1* | 6/2006 | Cai | ................. | H04L 12/14 370/466 |
| 2007/0100981 A1* | 5/2007 | Adamczyk | ............ | H04L 69/18 709/223 |
| 2007/0103117 A1* | 5/2007 | Burghardt | ............ | H04L 12/14 320/119 |
| 2007/0111705 A1* | 5/2007 | Zhang | ................. | H04L 12/14 455/405 |

(Continued)

OTHER PUBLICATIONS

International Search Report and Written Opinion dated Nov. 13, 2012 corresponding to International Patent Application No. PCT/EP2012/054780.

(Continued)

*Primary Examiner* — Kevin Mew
(74) *Attorney, Agent, or Firm* — Squire Patton Boggs (US) LLP (57) ABSTRACT

Certain embodiments may have measures that include establishing a connection between a network and a neighboring network for transiting a transmission session, obtaining connection state parameters based on at least one of the connection, the network, and the neighboring network, and generating a charging information message based on the connection state parameters at a network interface side, and receiving a charging information message related to a connection between a network and a neighboring network for transiting a transmission session, storing connection state parameters based on the charging information message, and generating an account for the transmission session based on the connection state parameters at a charging evaluation side.

16 Claims, 6 Drawing Sheets

(56) References Cited

U.S. PATENT DOCUMENTS

| | | | |
|---|---|---|---|
| 2007/0171852 A1* | 7/2007 | George | H04W 88/06 370/328 |
| 2007/0189300 A1* | 8/2007 | Bellora | H04L 12/14 370/395.2 |
| 2008/0046573 A1* | 2/2008 | Ropolyi | H04L 12/14 709/227 |
| 2008/0101570 A1* | 5/2008 | Cai | H04M 15/00 379/115.01 |
| 2008/0195535 A1* | 8/2008 | Liu | G06Q 20/10 705/39 |
| 2008/0205381 A1* | 8/2008 | Zhu | G06Q 20/10 370/352 |
| 2008/0253403 A1* | 10/2008 | Bondy | H04L 29/12188 370/485 |
| 2008/0256251 A1* | 10/2008 | Huotari | H04L 67/16 709/229 |
| 2009/0088129 A1* | 4/2009 | Cai | H04L 12/1403 455/406 |
| 2009/0305662 A1* | 12/2009 | Ala-Luukko | H04L 12/14 455/406 |
| 2010/0041365 A1* | 2/2010 | Lott | G06Q 30/016 455/406 |
| 2010/0174630 A1* | 7/2010 | Shan | G06Q 30/04 705/34 |
| 2010/0228655 A1* | 9/2010 | Chen | G06Q 30/04 705/34 |
| 2010/0259386 A1* | 10/2010 | Holley | G06Q 30/02 340/568.1 |
| 2011/0066530 A1* | 3/2011 | Cai | H04L 12/1403 705/30 |
| 2011/0238547 A1* | 9/2011 | Belling | G06Q 30/04 705/34 |
| 2012/0244861 A1* | 9/2012 | Agarwal | H04L 45/38 455/435.1 |
| 2013/0053027 A1* | 2/2013 | Lau | H04W 76/022 455/432.1 |
| 2013/0142182 A1* | 6/2013 | Gundavelli | H04W 8/02 370/338 |
| 2014/0126389 A1* | 5/2014 | Lau | H04L 65/1016 370/252 |
| 2014/0237127 A1* | 8/2014 | Vass | H04L 65/1016 709/227 |
| 2014/0334360 A1* | 11/2014 | Rubin | H04W 72/046 370/280 |

OTHER PUBLICATIONS

Deutsche Telekom: "IMS_IOI_CH Input on IBCF Behaviour," 3GPP Draft, 3GPP TSG CT WG1 Meeting #76, C1-120848, Xiamen (P.R. China), Feb. 6-10, 2012, 3 pp.

Nokia Siemens Networks: "Type 2 IOI in IBCF," 3GPP Draft, 3GPP TSG CT WG1 Meeting #55, C1-083059, Budapest, Hungary, Aug. 18-22, 2008, 4 pp.

3GPP / 3GPP TS 29.165 V11.2.0 (Mar. 2012) Technical Specification 3rd Generation Partnership Project; Technical Specification Group Core Network and Terminals; Inter-IMS Network to Network Interface (NNI) (Release 11) / Mar. 16, 2012, 116 pages.

3GPP / 3GPP TS 32.260 V11.3.0 (Mar. 2012) Technical Specification 3rd Generation Partnership Project; Technical Specification Group Services and System Aspects; Telecommunication management; Charging management; IP Multimedia Subsystem (IMS) charging (Release 11) / Mar. 16, 2012, 137 pages.

3GPP / 3GPP TS 32.299 V11.3.0 (Mar. 2012) Technical Specification 3rd Generation Partnership Project; Technical Specification Group Services and System Aspects; Telecommunication management; Charging management; Diameter charging applications (Release 11) / Mar. 16, 2012, 150 pages.

3GPP / 3GPP TR 23.850 V11.0.0 (Dec. 2011) Technical Report 3rd Generation Partnership Project; Technical Specification Group Services and System Aspects; Study on roaming architecture for voice over IP Multimedia Subsystem (IMS) with local breakout (Release 11)/ Dec. 16, 2011, 40 pages/.

3GPP / 3GPP TS 24.229 V11.3.0 (Mar. 2012) Technical Specification 3rd Generation Partnership Project; Technical Specification Group Core Network and Terminals; IP multimedia call control protocol based on Session Initiation Protocol (SIP) and Session Description Protocol (SDP); Stage 3 (Release 11) / Mar. 16, 2012, 728 pages.

3GPP TS 32.298 V11.2.0 (Mar. 2012) Technical Specification 3rd Generation Partnership Project; Technical Specification Group Services and System Aspects; Telecommunication management; Charging management; Charging Data Record (CDR) parameter description (Release 11) / Mar. 2012, 145 pages.

* cited by examiner

NETWORK INTERFACE UTILIZATION DEPENDENT CHARGING DETERMINATION

FIELD

The present invention relates to network interface utilization dependent charging determination. More specifically, the present invention exemplarily relates to measures (including methods, apparatuses and computer program products) for realizing network interface utilization dependent charging determination.

BACKGROUND

The present specification generally relates to charging determination procedures in network deployments with respect to a transmission of data from a terminal to another terminal during a session transited via a plurality of networks operated by a plurality of network operators. In general, in such network deployment of a plurality of networks operated by a plurality of network operators, the amount of the transmission session performed in each of the involved networks operated by an operator, respectively, is to be determined in order to account for the occurred traffic between the involved operators.

The 3GPP TS 29.165 defines an Interconnect Border Control Function (IBCF) as the IP Multimedia Subsystem (IMS) network element located at the border between interconnected networks. The IBCF is capable of performing IMS charging for traffic delivered from one network to another. The 3GPP TS 32.260 specifies the charging interface of such IBCF based on the known authentication, authorization and accounting protocol Diameter for reporting the delivered traffic to an OFfline Charging System (OFCS).

In an end-to-end IMS communication, e.g. in an IMS session between two terminals, the IBCF can be deployed in each transited IMS-based network at the borders to neighboring networks. Interconnection case complexity for a IMS session can range from direct interworking of an originating and a terminating network up to the scenarios where the session path of the IMS session intersects a series of multiple networks. Such complex scenarios occur when the UE, that is, one of the involved terminals, is roaming in a visited network, or, in case of indirect interconnections, when an IMS session is routed to its destination via one or more transit networks.

The IBCFs deployed on either side of the NNI (Network to Network Interface), that is, on each side of the border between interconnected networks, perform session-based or event-based charging by way of sending accounting requests (ACR) to the OFCS. Session-based charging means that the consumed charge units are continuously accumulated during the session, which may exemplarily be implemented as charging per byte of upload/download transmission. In contrary, event-based charging means that for a certain event a predetermined number of charge units is consumed independent of the byte number or time length of the transmission corresponding to the event.

The Diameter ACRs carry a set of charging parameters characteristic for the particular chargeable event or session. This set is specified in the 3GPP TS 32.260 with the syntax definitions in the 3GPP TS 32.299. Subsequently, the OFCS transforms the received charging parameters into Charging Data Records (CDR) for a Billing System (BS). Using the CDRs, the BS is able to account for the occurred traffic between the involved operators of the transited session, that is, between the operators of networks involved in the IMS communication of the transited session. The payment incurred by the IMS communication thus primarily relies on a set of charging parameters, which should be comprehensive enough for the operators to recognize which of the traffic cases has been recorded by a particular IBCF in order to assign the corresponding tariff for inter-operator accounting.

Multiple logical IBCF instances can be involved in the path of a single IMS communication scenario, which will result in multiple ACRs sent from the same network element type and consequently in multiple CDRs from the same network element type compiled for the BS. Although the actually handled chargeable event on each segment of the signaling path may for each instance concern different interconnection partners and be subjected to different payment flows or tariffs, the standardized CDR parameters fail to carry enough charging information to allow such traffic classification, i.e. to allow distinguishing between the indicated different conditions of the chargeable events.

To achieve such distinguishing between traffic cases, i.e. between the indicated different conditions of the chargeable events, one (logical) IBCF instance can be dedicated to one (physical) IBCF node. A logical IBCF instance is the functioning of a network node as an IBCF for a certain IMS session, whereas the physical IBCF node is the network node itself. Such dedication would considerably decrease efficiency of network resources utilization.

The 3GPP TS 32.260 defines a charging parameter identifying involved operators among each other related to transiting a session. Namely, a Transit Inter Operator Identifier (Transit-IOI) deals with scenarios of interworking between multiple IMS networks. Each network involved in the IMS session forwards its identity to its neighboring networks through Session Initiation Protocol (SIP) signalling. As a result, the CDR generated with respect to each network can contain the received list of involved networks between the originating and the terminating networks. Hence, an accounting based on the list of involved networks between the originating and the terminating networks may be applicable.

The proposed principle solves charging problems in interworking scenarios. However, according to 3GPP TS 24.229, the IOI parameters are not shared between the interconnected networks for IMS sessions on the path between the HPLMN and VPLMN, which may cause difficulty in identifying properly any transit network operator between the roaming partners. Consequently, the proposed principle is not fully appropriate for traffic between the Visited Public Land Mobile Network (VPLMN) and the Home Public Land Mobile Network (HPLMN) in a roaming scenario. In addition, the charging results according to this proposed principle are only reliable when the operators are in a trusted relationship with each other. A prevention of manipulating the list is not shown in the stated technical specification (TS). Hence, an untrusted partner may sometimes be suspected to fraudulently manipulate the values in the list to increase the own revenue while keeping the basic SIP delivery mechanism unaffected. Thus, even if the Transit-IOI is available in charging, the necessary reliability of such information is not always derivable from the CDR.

The 3GPP TS 23.850 focuses on an optimal media routing in an IMS roaming scenario. For correct charging of various roaming sub-variants, the study recommends for the inter-operator charging a selective usage of a CDR generated by the Proxy Call Session Control Function (P-CSCF) in a VPLMN or, if available, the CDR generated by an anchoring element, namely the Transit and Routing Function (TRF), in the same re-entered network, that is, in the re-entered VPLMN. Thus, according to the proposed principle differentiation of the roaming scenario sub-variants (with or without optimized media routing) on the originating side is provided. However, charging of traffic on multiple segments of an IMS session path in relation to the involved IBCFs is not considered.

Hence, the problem arises that relevant charging information differentiating one traffic case handled by an IBCF from another traffic case handled by this IBCF or by another IBCF is not gathered in CDRs. Such missing charging information can lead to inaccurate inter-operator accounting and may cause revenue losses or unnecessary disputes between the operators.

Hence, there is a need to provide for network interface utilization dependent charging determination.

SUMMARY

Various exemplary embodiments of the present invention aim at addressing at least part of the above issues and/or problems and drawbacks.

Various aspects of exemplary embodiments of the present invention are set out in the appended claims.

According to a first aspect of the present invention, there is provided a method comprising establishing a connection between a network and a neighboring network for transiting a transmission session, obtaining connection state parameters based on at least one of said connection, said network, and said neighboring network, and generating a charging information message based on said connection state parameters.

In the method, said connection state parameters may comprise at least one of a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network.

In the method, the obtaining may comprise setting said roaming indication parameter to non-roaming, if roaming is not used for said connection between said network and said neighboring network, setting said roaming indication parameter to roaming, if roaming is used for said connection between said network and said neighboring network, and setting said roaming indication parameter to roaming loopback, if roaming is used for said connection between said network and said neighboring network and if said connection is returned to or from said neighboring network, and/or the obtaining may comprise setting said connection direction parameter to inbound, if said connection is incoming with respect to said network, and setting said connection direction parameter to outbound, if said connection is outgoing with respect to said network, and/or the obtaining may comprise setting said trust parameter to trusted, if said connection to said neighboring network is trustable, and setting said trust parameter to untrusted, if said connection to said neighboring network is not trustable, and/or the obtaining may comprise setting said address parameter to an IP address of said connected neighboring network.

In the method, the generating may comprise aggregating at least said connection state parameters to said charging information message.

In the method, the establishing may be performed between said network and two neighboring networks for transiting said transmission session from one of said two neighboring networks to the other of said two neighboring networks, the obtaining may be performed with respect to any of said two neighboring networks, and the generating may comprise aggregating at least said connection state parameters with respect to any of said two neighboring networks to said charging information message.

The method may further comprise transmitting said charging information message.

According to a second aspect of the present invention, there is provided a method comprising receiving a charging information message related to a connection between a network and a neighboring network for transiting a transmission session, storing connection state parameters based on said charging information message, and generating a CDR to account for said transmission session based on said connection state parameters.

In the method said connection state parameters may comprise at least one of a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network.

According to a third aspect of the present invention, there is provided an comprising a connection controller configured to establish a connection between a network and a neighboring network for transiting a transmission session, a control circuit configured to obtain connection state parameters based on at least one of said connection, said network, and said neighboring network, and to generate a charging information message based on said connection state parameters.

In the apparatus, said connection state parameters may comprise at least one of a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network.

In the apparatus, said control circuit may further be configured to set said roaming indication parameter to non-roaming, if roaming is not used for said connection between said network and said neighboring network, to set said roaming indication parameter to roaming, if roaming is used for said connection between said network and said neighboring network, and to set said roaming indication parameter to roaming loopback, if roaming is used for said connection between said network and said neighboring network and if said connection is returned to or from said neighboring network, and/or to set said connection direction parameter to inbound, if said connection is incoming with respect to said network, and to set said connection direction parameter to outbound, if said connection is outgoing with respect to said network, and/or to set said trust parameter to trusted, if said connection to said neighboring network is trustable, and to set said trust parameter to untrusted, if said connection to said neighboring network is not trustable, and/or to set said address parameter to an IP address of said connected neighboring network.

In the apparatus, said control circuit may further be configured to aggregate at least said connection state parameters to said charging information message.

In the apparatus, said control circuit may further be configured to establish said connection between said network and two neighboring networks for transiting said transmission session from one of said two neighboring networks to the other of said two neighboring networks, to obtain said connection state parameters with respect to any of said two neighboring networks, and to aggregate at least said connection state parameters with respect to any of said two neighboring networks to said charging information message.

The apparatus may further comprise a transmission controller configured to transmit said charging information message.

The apparatus may be operable as or at an inbound network interface connected to a neighboring network, or as or at an outbound network interface connected to a neighboring network, or as or at an inbound network interface connected to one of two neighboring networks and as or at an outbound network interface connected to the other of said two neighboring networks.

According to a fourth aspect of the present invention, there is provided an comprising a receiving controller configured to receive a charging information message related to a connection between a network and a neighboring network for transiting a transmission session, a storing circuit configured to store connection state parameters based on said charging information message, and a control circuit configured to generate a CDR to account for said transmission session based on said connection state parameters.

In the apparatus, said connection state parameters may comprise at least one of a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network.

The apparatus may be operable as or at an offline charging system.

According to a fifth aspect of the present invention, there is provided a computer program product comprising computer-executable computer program code which, when the program is run on a computer, is configured to perform the methods according to the first or second aspect.

The computer program product according may comprise a computer-readable medium on which the computer-executable computer program code is stored, and/or wherein the program is directly loadable into an internal memory of the processor.

Any one of the above aspects enables an efficient determination of relevant charging information related to network elements located at the border between interconnected networks, which are suitable for differentiating one traffic case handled by such network element from another traffic case handled by this network element or by another network element.

By way of exemplary embodiments of the present invention, there is provided network interface utilization dependent charging determination. More specifically, by way of exemplary embodiments of the present invention, there are provided measures and mechanisms for realizing network interface utilization dependent charging determination.

Thus, improvement is achieved by methods, apparatuses and computer program products enabling/realizing network interface utilization dependent charging determination.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, IMS communication and charging related to the IMS communication is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any network compound in which network elements located at the border between interconnected networks of each of the interconnected networks are connecting the interconnected networks, and charging information related to the network elements located at the border between interconnected networks are determined for accounting.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) network interface utilization dependent charging determination.

According to exemplary embodiments of the present invention, many logical IBCF instances are implemented by a minimum of physical IBCF nodes. Thereby, a network node (physical IBCF) can serve as a logical IBCF for a plurality of IMS sessions, and in each of the plurality of IMS sessions, the traffic case scenarios from the logical IBCFs view may be different from each other. In particular, according to exemplary embodiments of the present invention, one (physical) IBCF node performs each of the group of logical IBCF instances corresponding to an IMS session in its related network.

Involvement of an IBCF in IMS session scenarios more complex than the simple one with an IBCF in the originating HPLMN and the other IBCF in the terminating HPLMN has to be accommodated by the adequate interconnection case sensitivity in charging information supplied by the IBCF.

An improved interconnection case sensitivity according to exemplary embodiments of the present invention allows the physical IBCF node to be utilized on an arbitrary segment of the IMS session path and to supply enough information distinctive for each IMS session traversal to the operator's BS. The operators will be able to unambiguously identify the recorded event with one of many pre-defined cases of accountable traffic in their commercial portfolio.

Figure 1:
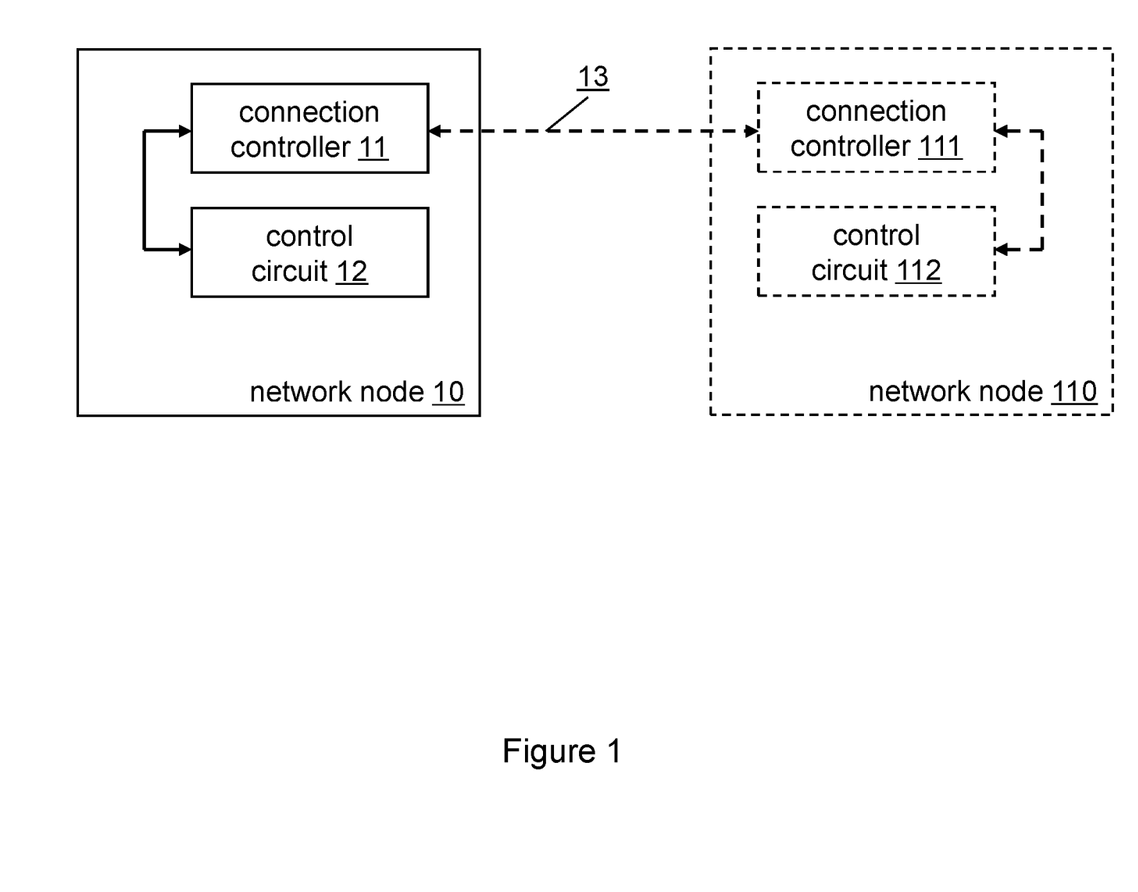
FIG. 1 is a block diagram illustrating an apparatus according to exemplary embodiments of the present invention.

FIG. 1 is a block diagram illustrating an apparatus according to exemplary embodiments of the present invention.

As shown in FIG. 1, according to exemplary embodiments of the present invention, the apparatus is a network node 10 comprising a connection controller 11 and a control circuit 12. The connection controller 11 establishes a connection between a network and a neighboring network for transiting a transmission session. The control circuit 12 obtains connection state parameters based on at least one of said connection, said network, and said neighboring network. Further, the control circuit 12 generates a charging information message based on said connection state parameters.

According to further exemplary embodiments of the present invention, said connection state parameters comprise at least one of a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network.

According to still further exemplary embodiments of the present invention, the control circuit 12 further sets said roaming indication parameter to non-roaming, if roaming is not used for said connection between said network and said neighboring network, sets said roaming indication parameter to roaming, if roaming is used for said connection between said network and said neighboring network, and sets said roaming indication parameter to roaming loopback, if roaming is used for said connection between said network and said neighboring network and if said connection is returned to or from said neighboring network.

According to still further exemplary embodiments of the present invention, the control circuit 12 further sets said connection direction parameter to inbound, if said connection is incoming with respect to said network, and sets said connection direction parameter to outbound, if said connection is outgoing with respect to said network.

According to still further exemplary embodiments of the present invention, the control circuit 12 further sets said trust parameter to trusted, if said connection to said neighboring network is trustable, and sets said trust parameter to untrusted, if said connection to said neighboring network is not trustable.

According to still further exemplary embodiments of the present invention, the control circuit 12 further sets said address parameter to an IP address of said connected neighboring network.

According to further exemplary embodiments of the present invention, the control circuit 12 aggregates at least said connection state parameters to said charging information message.

According to still further exemplary embodiments of the present invention, the control circuit establishes said connection between said network and two neighboring networks for transiting said transmission session from one of said two neighboring networks to the other of said two neighboring networks, obtains said connection state parameters with respect to any of said two neighboring networks, and aggregates at least said connection state parameters with respect to any of said two neighboring networks to said charging information message.

According to further exemplary embodiments of the present invention, the the apparatus 10 comprises a transmission controller which transmits said charging information message.

According to exemplary embodiments of the present invention, the apparatus 10 as shown in FIG. 1 is operable as or at an inbound network interface connected to a neighboring network, or as or at an outbound network interface connected to a neighboring network, or as or at an inbound network interface connected to one of two neighboring networks and as or at an outbound network interface connected to the other of said two neighboring networks.

In particular, the apparatus 10 as shown in FIG. 1 is an IBCF at the border between two interconnected networks. As shown in FIG. 1, such IBCF may be connected to a similar second IBCF 110 related to a second network of two interconnected networks via a connection line 13.

Figure 2:
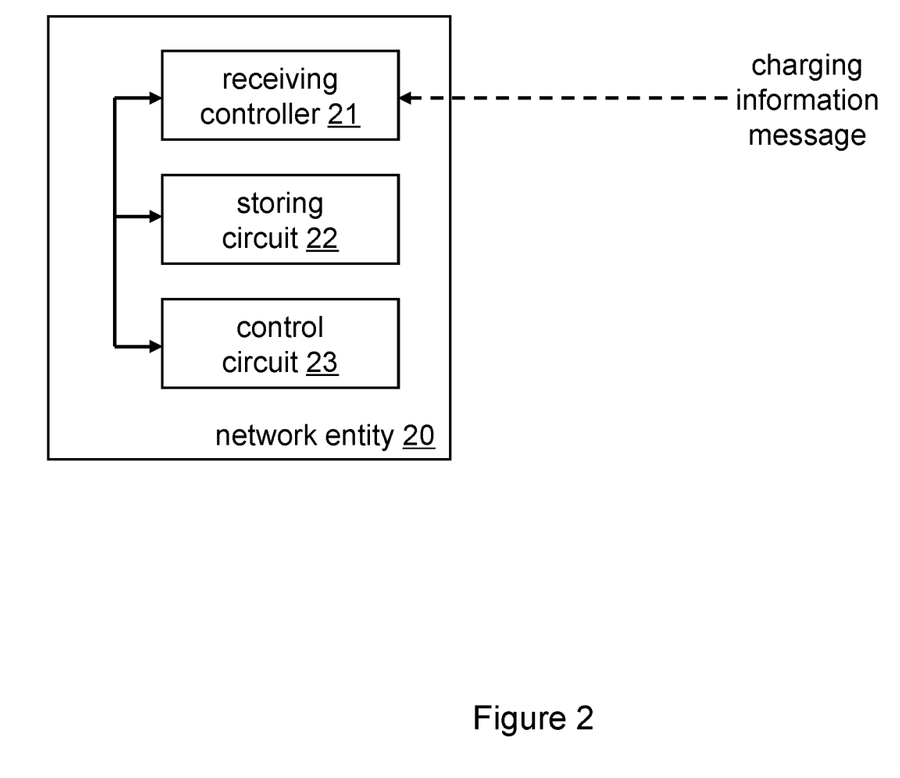
FIG. 2 is a block diagram illustrating an apparatus according to exemplary embodiments of the present invention.

FIG. 2 is a block diagram illustrating an apparatus according to exemplary embodiments of the present invention.

As shown in FIG. 2, according to exemplary embodiments of the present invention, the apparatus is a network entity 20 comprising a receiving controller 21, a storing circuit 22 and a control circuit 23. The receiving controller 21 receives a charging information message related to a connection between a network and a neighboring network for transiting a transmission session. The storing circuit 22 stores connection state parameters based on said charging information message. The control circuit 23 generates an account for said transmission session based on said connection state parameters.

According to further exemplary embodiments of the present invention, said connection state parameters comprise at least one of a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network.

According to still further exemplary embodiments of the present invention, the control circuit assigns a predetermined payment tariff to said transiting said transmission session based on said connection state parameters, and calculates a traffic fee for said transiting said transmission session based on said tariff.

According to exemplary embodiments of the present invention, the apparatus 20 as shown in FIG. 2 is operable as or at an offline charging system.

Further, according to exemplary embodiments of the present invention, the account generated for the traffic caused by the transmission session is billed between the operators of the networks involved in said transmission session.

According to further exemplary embodiments of the present invention, the charging information message received by said receiving controller 21 of said network entity 20 according to FIG. 2 corresponds to the charging information message transmitted by the transmission controller of the network node 10 according to FIG. 1.

Figure 3:
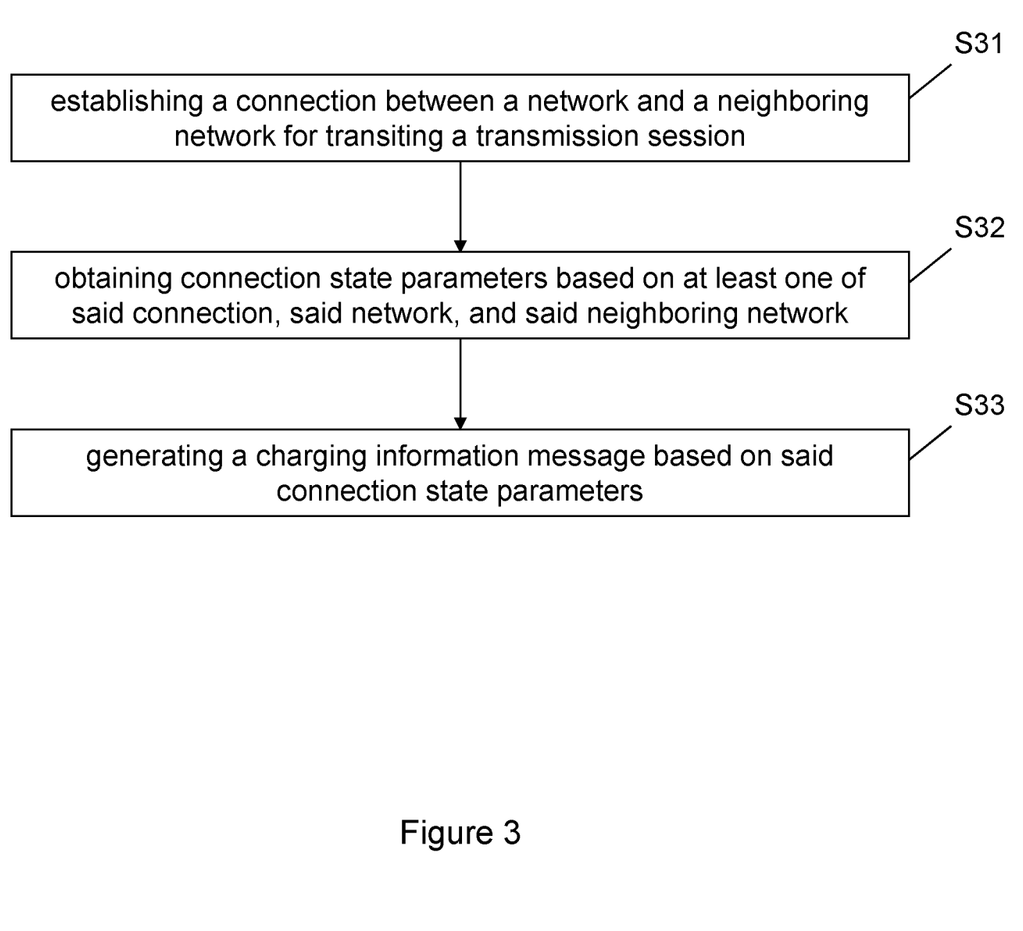
FIG. 3 is a schematic diagram of a procedure according to exemplary embodiments of the present invention.

FIG. 3 is a schematic diagram of a procedure according to exemplary embodiments of the present invention.

As shown in FIG. 3, a procedure according to exemplary embodiments of the present invention comprises an operation of establishing a connection between a network and a neighboring network for transiting a transmission session, an operation of obtaining connection state parameters based on at least one of said connection, said network, and said neighboring network, and an operation of generating a charging information message based on said connection state parameters.

According to further exemplary embodiments of the present invention, said connection state parameters comprise at least one of a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network.

By extending the set of the IBCF charging information by four new parameters, an increased awareness about the interconnection case is achieved. As already stated above, the following parameters are added to the regular IBCF charging information:

The NNI-Type (roaming indication parameter) indicates whether the IBCF uses the NNI for non-roaming, roaming, or roaming loopback traffic. The Session-Direction (connection direction parameter) indicates whether the concerned IBCF serves as an entry or an exit point of the own network. The Relationship-Mode (trust parameter) indicates whether the relationship with neighboring network is trusted or untrusted. The Neighbor-Node-Address (address parameter) represents the IP address of the contact point of the session path in the neighboring network.

The concept of the interconnection charging parameters is optimized mainly for orthogonality while preserving their clarity and homogeneity. Further, they combine harmonically with the existing 3GPP-specified Diameter Attribute Value Pair (AVP) defined for IBCF ACR messages to yield together the full description requisite for accurate inter-operator accounting. The interconnection charging parameters will take form of AVPs in an accounting message and mapped in CDR to equivalent fields.

The thus structured AVP parameters (structured as standardized in 3GPP TS 32.299) convey for each IBCF instance individual service information. Thereby, the AVP parameters according to the present invention are structured as follows:

NNI-Type AVP (roaming indication parameter):
The NNI-Type AVP is of type Enumerated and indicates whether the IBCF uses the NNI for non-roaming, roaming, or roaming loopback traffic, and is implemented as follows:
0 non-roaming,
1 roaming, and
2 roaming loopback.

Session-Direction AVP (Connection Direction Parameter):
The Session-Direction AVP is of type Enumerated and indicates whether the connected IBCF serves as an entry or an exit point of the own network, and is implemented as follows:
0 inbound, and
1 outbound.

Relationship-Mode AVP (Trust Parameter):
The Relationship-Mode AVP is of type Enumerated and indicates whether the relationship with neighboring network is trusted or untrusted, and is implemented as follows:
0 trusted, and
1 untrusted.

Neighbor-Node-Address AVP (Address Parameter):
The Neighbor-Mode-Address is of type Address and holds the IP-address of the contact point of the session path in the neighboring network, i.e. the connected IBCF in the neighboring network.

According to a variation of the procedure shown in FIG. 3, exemplary details of the obtaining operation are given, which are inherently independent from each other as such.

Such exemplary obtaining operation according to exemplary embodiments of the present invention may comprise an operation of setting said roaming indication parameter to non-roaming, if roaming is not used for said connection between said network and said neighboring network, an operation of setting said roaming indication parameter to roaming, if roaming is used for said connection between said network and said neighboring network, an operation of setting said roaming indication parameter to roaming loopback, if roaming is used for said connection between said network and said neighboring network and if said connection is returned to or from said neighboring network, an operation of setting said connection direction parameter to inbound, if said connection is incoming with respect to said network, an operation of setting said connection direction parameter to outbound, if said connection is outgoing with respect to said network, an operation of setting said trust parameter to trusted, if said connection to said neighboring network is trustable, an operation of setting said trust parameter to untrusted, if said connection to said neighboring network is not trustable, and/or an operation of setting said address parameter to an IP address of said connected neighboring network.

In the following, it is described how the connection state parameters in the charging information message, i.e. the charging parameters in the ACR can be used for determination of the actual traffic cases with respect to the involved IBCF(s).

Regarding detailed meaning and usage of the parameters, the value of NNI-Type identifies whether an IMS session dispatched via a network border is a network-to-network interworking case or whether the IMS session uses a roaming service provided by the VPLMN.

Superficial, it may seem as if the direction of a session (inbound, outbound) could have been derived from the 3GPP-standardized Diameter parameter Role-Of-Node AVP ("originating" or "terminating"). However, this is only possible for direct interconnections between the originating HPLMN and the terminating HPLMN. Because from the parameter the direction could not be inferred for IBCF deployments in VPLMN-HPLMN interconnections and where transit networks have been involved, a new dedicated parameter Session-Direction AVP ("inbound" or "outbound") is proposed.

The NNI-Type AVP value "roaming" combined with Session-Direction AVP and Role-Of-Node AVP enables the operator to distinguish which of the following traffic cases is processed by a logical IBCF instance:
1.) Outbound traffic in the own originating VPLMN network to the originating HPLMN,
2.) Inbound traffic in the own originating HPLMN network from the originating HPLMN,
3.) Outbound traffic in the own terminating HPLMN network to the terminating VPLMN, or
4.) Inbound traffic in the own terminating VPLMN network from the terminating HPLMN.

The value "roaming loopback" combined with Session-Direction AVP allows to distinguish which of the following traffic cases the own logical IBCF instance processed in a session path:
5.) Outbound traffic in the own HPLMN returned back to the VPLMN, or
6.) Inbound traffic in the own VPLMN returned back from the HPLMN.

Both NNI-Type AVP values "roaming" and "roaming loopback" refer to traffic subject to inter-operator accounting for roaming, the latter accommodates usage of the optimized media routing proposed in 3GPP TS 23.850. The NNI-Type AVP gives the operator opportunity to combine and select optimally the outputs from the P-CSCF, TRF, and/or IBCF charging in the VPLMN, and S-CSCF and/or IBCF charging in the HPLMN to provide underlying data for particular payment components incurred by roaming traffic (typically the roaming fee and the termination fee). The operator can apply the appropriate inter-operator tariff for this kind of traffic and can even decide to dedicate the entire responsibility for interconnection charging including roaming to the IBCF and exclude the P-CSCF and S-CSCF charging from the wholesale business.

The NNI-Type AVP value "non-roaming" combined with Session-Direction AVP allows to distinguish which of the following traffic cases the concerned logical IBCF instance relayed over the NNI:
7.) Outbound traffic in the own network to the next network without roaming relationship, or
8.) Inbound traffic in the own network from the previous network without roaming relationship.

The NNI-Type AVP value "non-roaming" combined with "trusted" Relationship-Mode AVP value indicates to the operator that the accounting partners can be reliably identified by Originating-IOI, Terminating-IOI, and Transit-IOI values, which are delivered from one network to another through SIP signaling as per 3GPP TS 24.229.

As a result, not only simplistic direct interworking but also indirect interconnections via one or multiple transit networks can be accounted for with the involved partner operators by applying the agreed accounting principle (e.g. cascading or direct accounting).

There are some inter-connection situations in which inter-operator accounting cannot fully rely on the IOI principle.

Primarily, when the "non-roaming" Session-Direction AVP value combines with "untrusted" Relationship-Mode AVP value, the operator will often prefer avoid dependence on the IOI parameters collected from signaling as well as on some other information elements on the application layer (such as Calling-Party-Address AVP, IMS Charging Identifier (ICID) AVP), whose sharing in SIP signaling between networks may be constrained by operators' policies.

The inter-operator accounting has a possibility to identify the partner network based on information elements which the operator can regard as reliable, namely the IP address of the neighbor node that will be collected from IP packets and included in the proposed Diameter Neighbor-Node-Address AVP according to the present invention.

As stated above, since according to 3GPP TS 24.229 the IOI parameters are not shared between the interconnected networks for IMS sessions on the path between the HPLMN and VPLMN, difficulty in identifying properly any transit network carrier between the roaming partners is caused.

Therefore, any operator involved in the indirect interconnections of roaming traffic need an IP address of the neighbor node to perform proper inter-operator accounting for the transited traffic. Usage of IP addresses in accounting in these cases will be limited to the cascading termination fee principle.

In addition to compensating deficiencies of the IOI principle as mentioned above, the IP address of the neighbor element can complement the IOI principle to increase granularity of charging information and enable the operator to apply distance based accounting, where each neighbor contact point represents a particular accountable distance. Besides, the IP address provides one more means for plausibility checks on charging data rendering inter-operator accounting more accurate.

Creating association between the IP address of the neighbor node and the name of its operator can be done in the BS or in the network elements itself. In the latter case, the IBCF, i.e. the apparatus 10 according to FIG. 1, can contain a table where groups of neighbor nodes are each gathered under a dedicated IOI name. Based on the operator policy, the configured IOI names may be supplied in the CDR as Originating IOI, Terminating 101, Transit 101 either by overriding 101 values received in signaling or as substitution of IOI values only if such information is missing in signaling.

According to a variation of the procedure shown in FIG. 3, exemplary details of the generating operation are given, which are inherently independent from each other as such.

Such exemplary generating operation according to exemplary embodiments of the present invention may comprise an operation of aggregating at least said connection state parameters to said charging information message.

According to a variation of the procedure shown in FIG. 3, exemplary details of the establishing operation, the obtaining operation and the generating operation are given, which are inherently independent from each other as such.

Such exemplary establishing operation according to exemplary embodiments of the present invention may be performed between said network and two neighboring networks for transiting said transmission session from one of said two neighboring networks to the other of said two neighboring networks. Further, an exemplary obtaining operation according to exemplary embodiments of the present invention may be performed with respect to any of said two neighboring networks. Further, an exemplary generating operation according to exemplary embodiments of the present invention may comprise an operation of aggregating at least said connection state parameters with respect to any of said two neighboring networks to said charging information message.

Hence, according to exemplary embodiments of the present invention, the quadruplet of the proposed interconnection Diameter AVPs can appear once or twice in one ACR and as corresponding ASN.1 (abstract syntax notation one, a standard and flexible notation that describes rules and structures for representing, encoding, transmitting, and decoding data in telecommunications and computer networking) replacement in the CDR to accommodate also the cases when one logical IBCF instance is able to integrate both outbound and inbound functions together (typically co-located with a TRF).

According to a variation of the procedure shown in FIG. 3, exemplary additional operations and are given, which are inherently independent from each other as such. According to such variation, an exemplary method according to exemplary embodiments of the present invention may comprise an operation of transmitting said charging information message.

Figure 4:
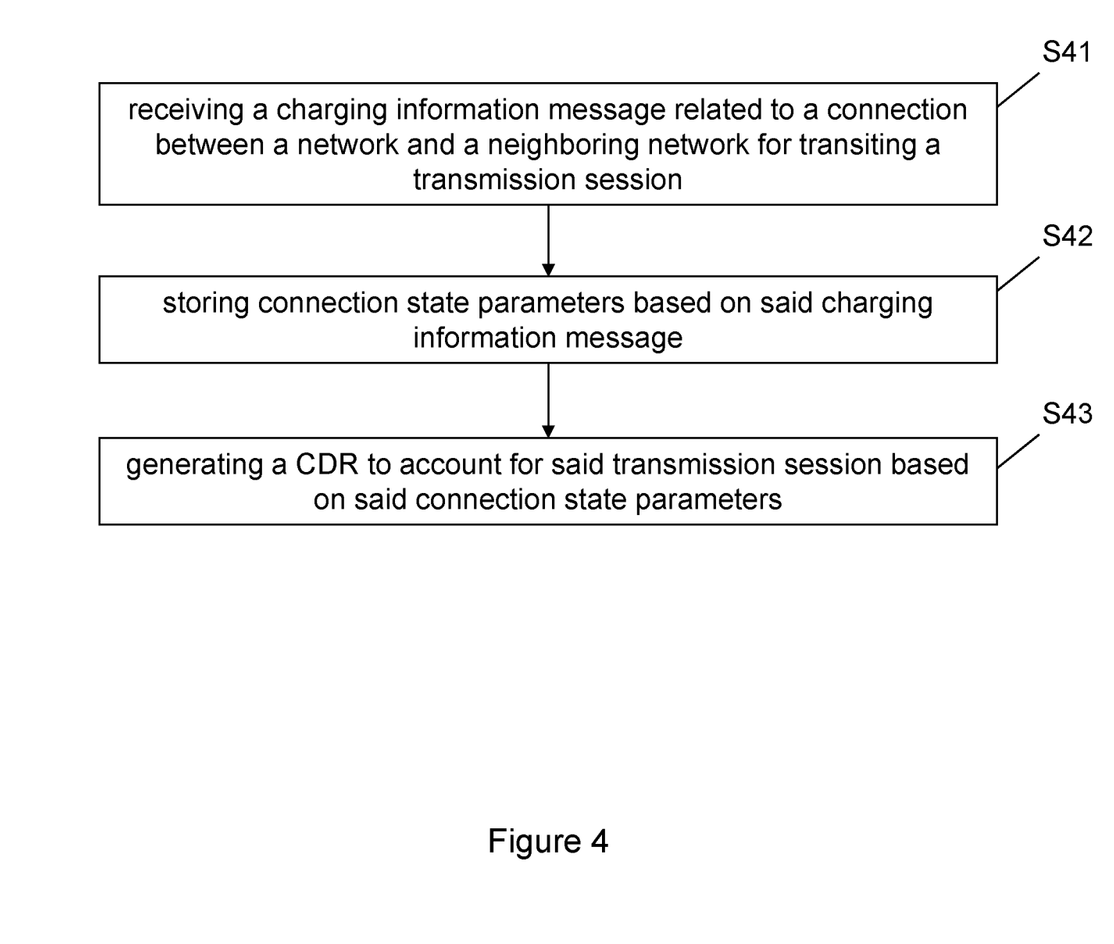
FIG. 4 is a schematic diagram of a procedure according to exemplary embodiments of the present invention.

FIG. 4 is a schematic diagram of a procedure according to exemplary embodiments of the present invention.

As shown in FIG. 4, a procedure according to exemplary embodiments of the present invention comprises an operation of receiving a charging information message related to a connection between a network and a neighboring network for transiting a transmission session, an operation of storing connection state parameters based on said charging information message, and an operation of generating a CDR to account for said transmission session based on said connection state parameters.

According to further exemplary embodiments of the present invention, said connection state parameters comprise at least one of a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network.

The thus generated CDRs may the be used by a BS in terms of assigning a predetermined payment tariff to said transiting said transmission session based on said connection state parameters, and calculating a traffic fee for said transiting said transmission session based on said tariff.

Figure 5:
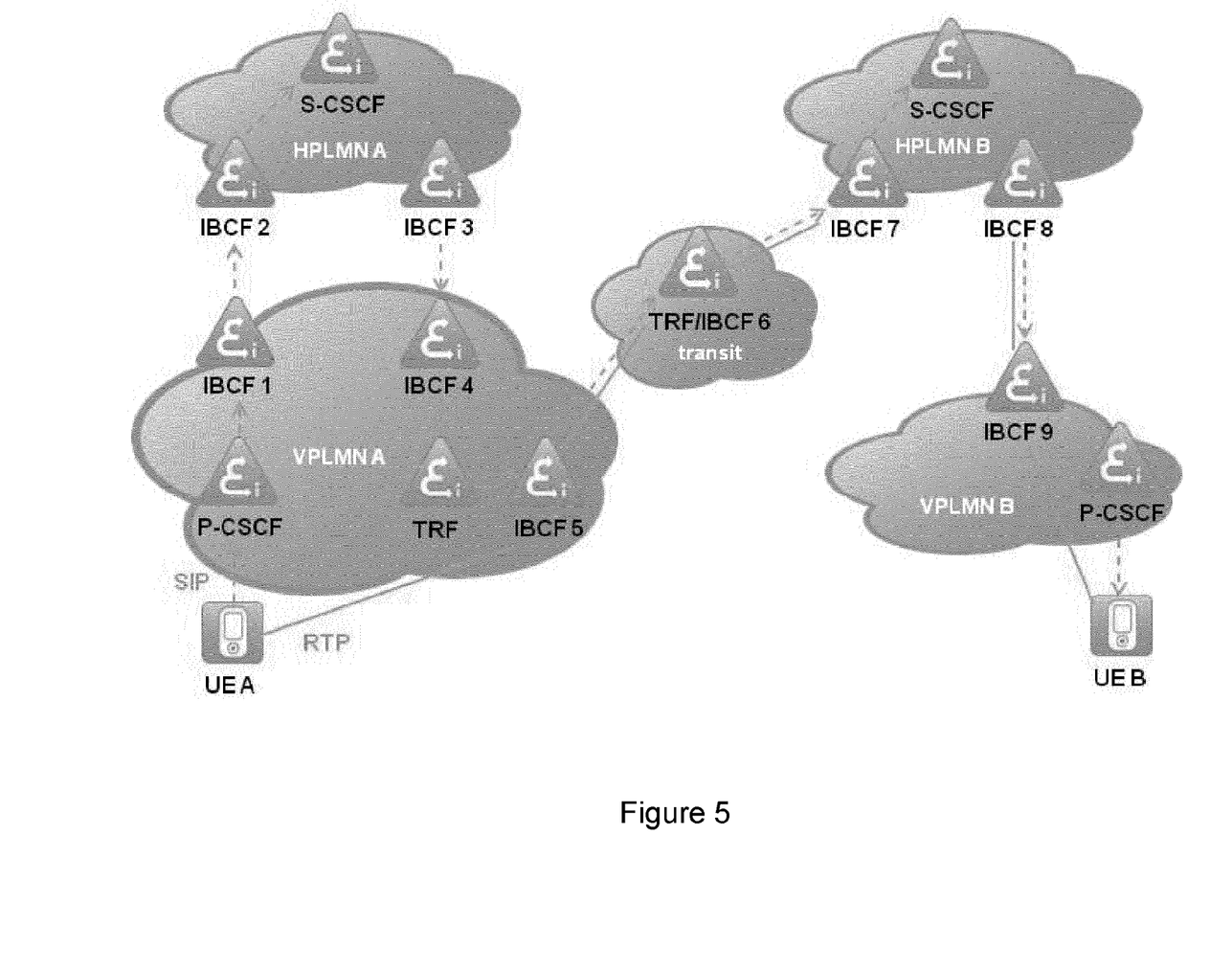
FIG. 5 shows a schematic diagram of an example of a system environment with signaling variants according to exemplary embodiments of the present invention.

FIG. 5 shows a schematic diagram of an example of a system environment with signaling variants according to exemplary embodiments of the present invention.

In FIG. 5 the usage of the interconnection parameters is illustrated by means of an exemplary complex scenario of an IMS session combining roaming and interworking interconnection variants including transit via an intermediary carrier network. However, the principle according to the present invention is not limited to complexity of the illustrated scenario. For example, particular NNIs can be composed of one or more intermediary transit networks.

According to FIG. 5, IBCF 1 to 9 depict logical instances several of which can be executed by one physical node re-entered by an IMS session. For example, IBCFs 2 and 3 may be implemented by the same physical IBCF node.

In addition, according to exemplary embodiments of the present invention, even if one physical node executes only a single logical IBCF instance with respect to on IMS session path, it can be used as a logical IBCF instance with respect to a session path of another IMS session. As a result, a physical IBCF node can implement any possible variant of a logical IBCF instance.

Figure 6:
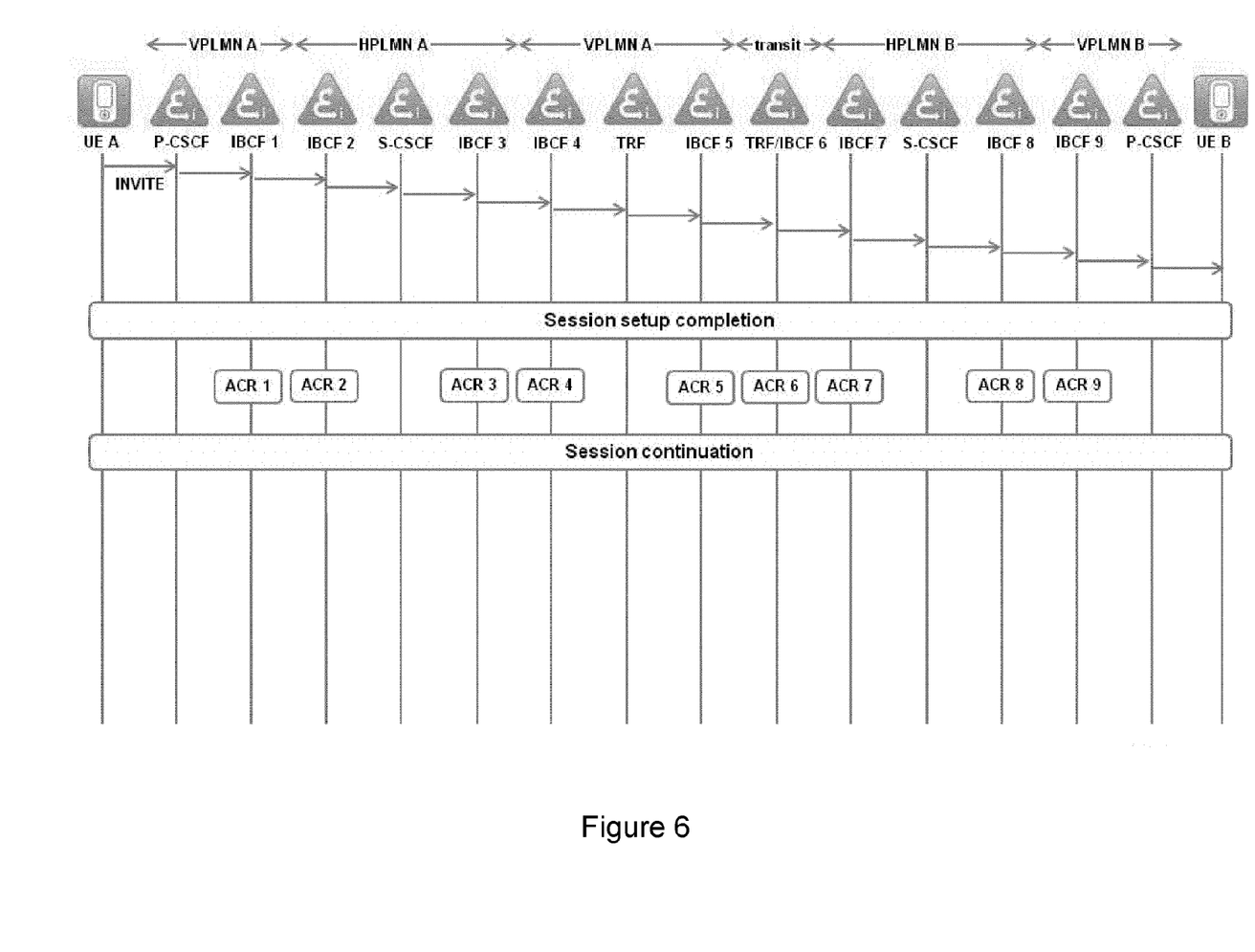
FIG. 6 shows a schematic diagram of signaling sequences according to exemplary embodiments of the present invention.

FIG. 6 shows a schematic diagram of signaling sequences according to exemplary embodiments of the present invention.

In FIG. 6 possible signaling sequences according to the exemplary complex scenario of an IMS session described in connection with FIG. 5 are illustrated. Thereby, the involved logical network function instances (User Equipment UE [A and B], Proxy Call Session Control Function P-CSCF [A and B], Interconnect Border Control Function IBCF [1 to 9], Serving Call Session Control Function S-CSCF [A and B] and Transit and Routing Function TRF) are allocated to certain networks (Visited Public Land Mobile Network VPLMN [A and B], Home Public Land Mobile Network HPLMN [A and B] and transit network).

According to exemplary embodiments of the present invention, the IMS communication session starts the session setup. During the session setup, an invitation signaling is transmitted from UA A to P-CSCF A, and is further forwarded to the connection target UE B. Once the session setup is completed, accounting sessions are started with respect to each of the involved network elements. The accounting sessions are started by transmitting ACRs from each of the involved network elements to an OFCS. Further, once the session setup is completed, the IMS communication session is continued until completion of the IMS session.

It is to be noted that in FIG. 6 only the accounting session starting ACRs caused by the logical IBCF instances according to exemplary embodiments of the present invention are shown. For reasons of clarity, it is refrained from illustrating ACRs caused by the remaining network function instances.

In the following, contents of exemplary ACRs caused by the logical IBCF instances 1 to 9 according to exemplary embodiments of the present invention are discussed in relation to the exemplary scenario of an IMS session described in connection with FIG. 5. Thereby, the parameters according to exemplary embodiments of the present invention included in the ACRs are implemented as Attribute Value Pair (AVP) similar to 3GPP-specified Diameter Attribute Value Pair (AVP) defined for IBCF ACR messages.

Thereby, a parameter Role-Of-Node known from 3GPP specification is in some cases relevant for the inter-operator accounting according to exemplary embodiments of the present invention. The Role-Of-Node AVP specifies whether the IMS node is serving the calling or is the called party. The Role-Of-Node AVP can attain two values:

originating role: The IMS node is applying an originating role, is serving the calling party, and
terminating role: The IMS node is applying a terminating role, is serving the called party.

ACR 1:
(Role-Of-Node AVP="terminating")
NNI-Type AVP="roaming"
Session-Direction AVP="outbound"
Relationship-Mode AVP="trusted"
Neighbor-Node-Address AVP=<IBCF2>

This combination of parameters indicates, that the traffic of the IMS session is outbound traffic from the own originating VPLMN A to the originating HPLMN A, and that termination fee recipient is identified by the IBCF 2 IP address.

In addition, this ACR can be a basis for roaming fee between the VPLMN A and HPLMN A.

ACR 2:
(Role-Of-Node AVP="originating")
NNI-Type AVP="roaming"
Session-Direction AVP="inbound"
Relationship-Mode AVP="trusted"
Neighbor-Node-Address=<IBCF1>

This combination of parameters indicates, that the traffic of the IMS session is inbound traffic to the own originating HPLMN A from the originating VPLMN A, and that a termination fee sender is identified by the IBCF 1 IP address.

In addition, this ACR can be a basis for roaming fee between the VPLMN A and HPLMN A.

ACR 3:
(Role-Of-Node AVP="originating")
NNI-Type AVP="roaming loopback"
Session-Direction AVP="outbound"
Relationship-Mode AVP="trusted"
Neighbor-Node-Address AVP=<IBCF4>

This combination of parameters indicates, that the traffic of the IMS session is outbound traffic from the own HPLMN A returned back to the VPLMN A, and that a termination fee recipient is identified by the IBCF 4 IP address.

In addition, this ACR can be a basis for roaming fee between the VPLMN A and HPLMN A.

ACR 4:
(Role-Of-Node AVP="originating")
NNI-Type AVP="roaming loopback"
Session-Direction AVP="inbound"
Relationship-Mode AVP="trusted"
Neighbor-Node-Address AVP=<IBCF3>

This combination of parameters indicates, that the traffic of the IMS session is inbound traffic to the own VPLMN A returned back from the HPLMN A, and that a termination fee sender is identified by the IBCF 3 IP address.

In addition, this ACR can be a basis for roaming fee between the VPLMN A and HPLMN A.

ACR 5:
(Role-Of-Node may be present but is not relevant for inter-operator accounting.)
NNI-Type AVP="non-roaming"
Session-Direction AVP=outbound"
Relationship-Mode AVP="untrusted"
Neighbor-Node-Address AVP=<IBCF6>

This combination of parameters indicates, that the traffic of the IMS session is outbound traffic from the own network to the next network without roaming relationship, and that a termination fee recipient is identified by the IBCF 6 IP address.

ACR 6 (Two Sets of Interconnection Information):
(Role-Of-Node may be present but is not relevant for inter-operator accounting.)
NNI-Type AVP="non-roaming"
Session-Direction AVP="inbound"
Relationship-Mode AVP="untrusted"
Neighbor-Node-Address AVP=<IBCF5>
NNI-Type AVP="non-roaming"
Session-Direction AVP="outbound"
Relationship-Mode AVP="untrusted"
Neighbor-Node-Address=<IBCF7>

This combination of parameters indicates, that the traffic of the IMS session is transit traffic through the own network without roaming relationship with the previous and the next network, that a termination fee sender is identified by the IBCF 5 IP address, and that a termination fee recipient is identified by the IBCF 7 IP address.

According to exemplary embodiments of the present invention, two sets of interconnection parameters are allowed in a single ACR to cover the cases when the IBCF (typically integrated with the TRF) performs both the entry and the exit function of a network. If the IBCF roles are distributed (as it is the case of the IBCF 4 and 5), separate ACRs each containing a single set of interconnection parameters are generated.

ACR 7:
(Role-Of-Node may be present but is not relevant for inter-operator accounting.)
NNI-Type AVP="non-roaming"
Session-Direction AVP="inbound"
Relationship-Mode AVP="untrusted"
Neighbor-Node-Address AVP=<IBCF6>

This combination of parameters indicates, that the traffic of the IMS session is inbound traffic to the own network from the previous network without roaming relationship, and that a termination fee sender is identified by the IBCF 6 IP address.

ACR 8:
(Role-Of-Node AVP="terminating")
NNI-Type AVP="roaming"
Session-Direction AVP="outbound"
Relationship-Mode AVP="trusted"
Neighbor-Node-Address AVP=<IBCF9>

This combination of parameters indicates, that the traffic of the IMS session is outbound traffic from the own terminating HPLMN B to the terminating VPLMN B, and that a termination fee recipient is identified by the IBCF 9 IP address.

In addition, this ACR can be a basis for roaming fee between the VPLMN B and HPLMN B.

ACR 9:
(Role-Of-Node AVP="terminating"
NNI-Type AVP="roaming"
Session-Direction AVP=inbound"
Relationship-Mode AVP="trusted"
Neighbor-Node-Address AVP=<IBCF8>

This combination of parameters indicates, that the traffic of the IMS session is inbound traffic to the own terminating VPLMN B from the terminating HPLMN B, and that a termination fee sender is identified by the IBCF 8 IP address.

In addition, this ACR can be a basis for roaming fee between the VPLMN B and HPLMN B.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that
  method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for network interface utilization dependent charging determination. Such measures exemplarily comprise establishing a connection between a network and a neighboring network for transiting a transmission session, obtaining connection state parameters based on at least one of said connection, said network, and said neighboring network, and generating a charging information message based on said connection state parameters at a network interface side, and receiving a charging information message related to a connection between a network and a neighboring network for transiting a transmission session, storing connection state parameters based on said charging information message, and generating an account for said transmission session based on said connection state parameters at a charging evaluation side.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ACR Accounting Request
ASN.1 Abstract Syntax Notation One
AVP Attribute Value Pair (attributes in Diameter)
BS Billing System
CDR Charging Data Record
CSCF Call Session Control Function
HPLMN Home Public Land Mobile Network
IBCF Interconnect Border Control Function
ICID IMS Charging IDentifier
IMS IP Multimedia Subsystem
IOI Inter Operator Identifier
IP Internet Protocol
NNI Network to Network Interface
OCFS OFfline Charging System
P-CSCF Proxy CSCF
S-CSCF Serving CSCF
SIP Session Initiation Protocol
TRF Transit and Routing Function
TS Technical Specification
UE User Equipment
VPLMN Visited Public Land Mobile Network

The invention claimed is:
1. A method, comprising:
    establishing a connection between a network and a neighboring network for transiting a transmission session,
    obtaining connection state parameters based on at least one of said connection, said network, and said neighboring network, generating a charging information message based on said connection state parameters, said connection state parameters comprising a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network, setting said trust parameter to trusted, if said connection to said neighboring network is trustable, and setting said trust parameter to untrusted, if said connection to said neighboring network is not trustable, and transmitting the charging information message to a network entity to generate charging data records (CDR).

2. The method according to claim 1, wherein said obtaining comprises at least one of:

setting said roaming indication parameter to non-roaming, if roaming is not used for said connection between said network and said neighboring network, setting said roaming indication parameter to roaming, if roaming is used for said connection between said network and said neighboring network, and setting said roaming indication parameter to roaming loopback, if roaming is used for said connection between said network and said neighboring network and if said connection is returned to or from said neighboring network, and setting said connection direction parameter to inbound, if said connection is incoming with respect to said network, and setting said connection direction parameter to outbound, if said connection is outgoing with respect to said network, and setting said address parameter to an IP address of said connected neighboring network.

3. The method according to claim 1, wherein said generating comprises aggregating at least said connection state parameters to said charging information message.

4. The method according to claim 1, wherein said establishing is performed between said network and two neighboring networks for transiting said transmission session from one of said two neighboring networks to the other of said two neighboring networks, said obtaining is performed with respect to any of said two neighboring networks, and said generating comprises aggregating at least said connection state parameters with respect to any of said two neighboring networks to said charging information message.

5. The method according to claim 1, further comprising transmitting said charging information message.

6. A method comprising:

receiving a charging information message related to a connection between a network and a neighboring network for transiting a transmission session, storing connection state parameters based on said charging information message, said connection state parameters comprising a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network, and generating charging data records (CDR) to account for said transmission session based on said connection state parameters, wherein said trust parameter is set to trusted, if said connection to said neighboring network is trustable, and said trust parameter is set to untrusted, if said connection to said neighboring network is not trustable.

7. An apparatus, comprising:

a connection controller configured to establish a connection between a network and a neighboring network for transiting a transmission session, and a control circuit configured to obtain connection state parameters based on at least one of said connection, said network, and said neighboring network, and to generate a charging information message based on said connection state parameters, said connection state parameters comprising a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network, wherein said control circuit is further configured to set said trust parameter to trusted, if said connection to said neighboring network is trustable, and to set said trust parameter to untrusted, if said connection to said neighboring network is not trustable, and wherein the connection controller is configured to transmit the charging information message to a network entity to generate charging data records.

8. The apparatus according to claim 7, wherein said control circuit is further configured to set said roaming indication parameter to non-roaming, if roaming is not used for said connection between said network and said neighboring network, to set said roaming indication parameter to roaming, if roaming is used for said connection between said network and said neighboring network, and to set said roaming indication parameter to roaming loopback, if roaming is used for said connection between said network and said neighboring network and if said connection is returned to or from said neighboring network, or set said connection direction parameter to inbound, if said connection is incoming with respect to said network, and to set said connection direction parameter to outbound, if said connection is outgoing with respect to said network, or set said address parameter to an IP address of said connected neighboring network.

9. The apparatus according to claim 7, wherein said control circuit is further configured to aggregate at least said connection state parameters to said charging information message.

10. The apparatus according to claim 7, wherein said control circuit is further configured to establish said connection between said network and two neighboring networks for transiting said transmission session from one of said two neighboring networks to the other of said two neighboring networks, obtain said connection state parameters with respect to any of said two neighboring networks, and aggregate at least said connection state parameters with respect to any of said two neighboring networks to said charging information message.

11. The apparatus according to claim 7, further comprising
- a transmission controller configured to transmit said charging information message.

12. The apparatus according to claim 7, wherein
- the apparatus is operable as or at an inbound network interface connected to a neighboring network, or
- as or at an outbound network interface connected to a neighboring network, or
- as or at an inbound network interface connected to one of two neighboring networks and as or at an outbound network interface connected to the other of said two neighboring networks.

13. An apparatus comprising
- a receiving controller configured to receive a charging information message related to a connection between a network and a neighboring network for transiting a transmission session,
- a storing circuit configured to store connection state parameters based on said charging information message, and
- a control circuit configured to generate charging data records (CDR) to account for said transmission session based on said connection state parameters, said connection state parameters comprising a roaming indication parameter indicative of usage of roaming for said connection between said network and said neighboring network, a connection direction parameter indicative of connection direction with respect to said network, a trust parameter indicative of a trust state between said network and said neighboring network, and an address parameter indicative of said neighboring network,
- wherein said trust parameter is set to trusted, if said connection to said neighboring network is trustable, and said trust parameter is set to untrusted, if said connection to said neighboring network is not trustable.

14. The apparatus according to claim 13, wherein
- the apparatus is operable as or at an offline charging system.

15. A computer program product comprising computer-executable computer program code embodied on a non-transitory computer-readable medium which, when the program is run on a computer, is configured to cause the computer to carry out the method according to claim 1.

16. The computer program product according to claim 15, wherein the program is directly loadable into an internal memory of the processor.

\* \* \* \* \*